United States Patent
Hodge

[11] Patent Number: 5,348,512
[45] Date of Patent: Sep. 20, 1994

[54] FRICTION REDUCED CONSTANT VELOCITY UNIVERSAL JOINT

[75] Inventor: Bobby L. Hodge, Charlotte, N.C.

[73] Assignee: Ina Bearing Company, Inc., Fort Mill, S.C.

[21] Appl. No.: 974,468

[22] Filed: Nov. 12, 1992

[51] Int. Cl.$^5$ .............................................. F16D 3/26
[52] U.S. Cl. ................................. 464/111; 464/132; 464/905
[58] Field of Search ............... 464/111, 120, 122, 123, 464/124, 132, 905

[56] References Cited

U.S. PATENT DOCUMENTS

| | | |
|---|---|---|
| 1,141,675 | 6/1915 | Yeakley . |
| 1,675,932 | 7/1928 | Howe . |
| 1,930,131 | 10/1933 | Padgett . |
| 1,985,693 | 12/1934 | Robinson . |
| 2,065,475 | 12/1936 | Robinson . |
| 2,386,754 | 10/1945 | Snyder ........................ 464/124 X |
| 2,897,581 | 8/1959 | Cowles et al. . |
| 3,210,136 | 10/1965 | Anderson . |
| 3,328,097 | 6/1967 | Wilson . |
| 3,490,251 | 1/1970 | Roethlisberger ............... 464/124 |
| 3,700,299 | 10/1972 | Batt . |
| 3,883,194 | 5/1975 | Pitner . |
| 4,192,154 | 3/1980 | Nakamura et al. ............. 464/111 |
| 4,223,932 | 9/1980 | Gonsalves ..................... 294/1 R |
| 4,580,995 | 4/1986 | Orain et al. ................... 464/111 |
| 4,619,628 | 10/1986 | Orain ........................... 464/111 |
| 4,684,356 | 8/1987 | Kimata et al. ................. 464/111 |
| 4,768,990 | 9/1988 | Farrezl et al. ................. 464/111 |
| 4,840,600 | 1/1989 | White et al. ................... 464/111 |

Primary Examiner—Daniel P. Stodola
Assistant Examiner—Eileen A. Dunn
Attorney, Agent, or Firm—Wigman, Cohen, Leitner & Myers

[57] ABSTRACT

A constant velocity universal joint including a housing having a plurality of longitudinally extending channels has an inner rotatable member having a plurality of radially disposed trunnions, each of which extends into a respective one of the channels. A ball and socket joint, including a ball member and a socket member, is disposed intermediate each trunnion and the housing. A bearing is located between each trunnion and the respective ball member to permit relatively frictionless axial movement between the trunnion and the respective ball member. The bearing includes a generally rectangularly shaped cage retaining a plurality of needle rollers on at least two of the sides of the cage. The central longitudinal axes of the needle rollers are disposed normally to the direction of axial movement of the trunnion with respect to the respective ball member.

10 Claims, 3 Drawing Sheets

FRICTION REDUCED CONSTANT VELOCITY UNIVERSAL JOINT

FIELD OF THE INVENTION

The present invention relates to a constant velocity universal joint, and more particularly to such a joint having a housing including a plurality of channels, an inner rotatable member having a plurality of trunnions, each of which extends into one of the channels of the housing, and a ball and socket joint disposed within each of the channels and positioned between the channel and the respective trunnion.

BACKGROUND OF THE INVENTION

Constant velocity universal joints (CVJ) are known in the art, as illustrated by commonly assigned U.S. Pat. No.4,840,600 to White et al., and the patents cited therein. As noted in the aforementioned commonly assigned U.S. patent, CVJs are used, for instance, in the transaxle of the front wheel drive system of a motor vehicle in which the engine transfers power through a transmission to the front wheels of the vehicle. In the aforementioned patent, as illustrated particularly in FIGS. 3-4 of that patent, one type of known CVJ utilizes a three-lobed housing, in which an inner rotatable member has three equi-angularly spaced, radially extending trunnions, each of which extends into one of the three lobes of the housing. Each trunnion supports a spherical ball and socket assembly positioned intermediate the trunnion and the housing to provide universal movement of the trunnion within the housing. Recirculating needle bearings are arranged between the socket and the housing to provide substantially frictionless axial movement between the housing and the rotatable member. This CVJ may be characterized as a recirculating needle CVJ.

Other similar CVJs are illustrated in each of U.S. Pat. Nos. 4,192,154 to Nakamora et al; 4,684,356 to Kamata et al; and 4,580,995 to Orain, each of which is cited in the aforementioned U.S. Pat. No. 4,840,600 to White et al.

In the known constructions and in the art in general a deficiency exists in the CVJ. In most known constant velocity joints, at the interface between the outer surface of the trunnion and the inner surface of the ball member disposed between the trunnion and the housing, there is sliding friction contact between the ball member and the trunnion. Of the known CVJs, only that of the aforementioned Orain patent discloses an antifriction bearing positioned at the aforesaid interface. However, the antifriction bearing disclosed in the Orain patent facilitates only frictionless movement of the trunnion with respect to the ball member in a direction parallel to the sliding axis of the CVJ. In the axial direction of movement between the ball member and the trunnion, a sliding friction interface still exists. At this sliding friction interface, the possibility exists for a "slip-stick" motion of the ball member as it translates axially relative to the trunnion. This slip-stick motion may create a roughness in the CVJ, which translates into a roughness or shudder potential in the automotive vehicle during operation.

It would be desirable, therefore, to reduce or eliminate entirely this potential slip-stick motion in a CVJ, as well as other potential vibration or resonance-inducing motions of the CVJ.

SUMMARY AND OBJECTS OF THE INVENTION

In view of the foregoing limitations and shortcomings of the prior art devices, as well as other disadvantages not specifically mentioned above, it should be apparent that there still exists a need in the art for a constant velocity universal joint which reduces or eliminates the possibility of undesirable shudder or vibration resulting from a slip-stick frictional engagement of the trunnion with the ball member of the CVJ.

More particularly, it is an object of this invention to provide a CVJ which allows reduced friction or frictionless axial translation between the trunnion and the ball member of the CVJ.

It is another object of the invention to reduce or eliminate the roughness in the movement of a CVJ.

Yet another object of this invention is to provide a CVJ which eliminates or reduces the shudder potential caused by such a joint in the automotive vehicle in which the joint is used.

Briefly described, the aforementioned objects are accomplished according to the invention by providing a CVJ which includes a housing having a plurality of longitudinally extending channels. An inner rotatable member has a plurality of radially disposed trunnions, each of the trunnions extending into a respective one of the channels, with a ball member mounted on a respective trunnion and disposed within a respective one of the channels. An antifriction bearing is located between each trunnion and its respective ball assembly member for providing relatively frictionless axial movement of the trunnion with respect to the respective ball member.

In one embodiment of the invention, the bearing assembly comprises a generally rectangularly-shaped cage preferably having a plurality of needle rollers retained on each of the sides of the cage. At a minimum the bearing may comprise two rows of needle rollers disposed in planes 180° apart on opposite sides of the trunnion and parallel to the axis of torque transmission between the inner rotatable member and the housing. The central longitudinal axes of the needle rollers are disposed normally to the direction of axial movement of the trunnion relative to the respective ball member.

In another embodiment of the invention, the cage is disposed at a 45° angle or diagonally with respect to the axis of torque transmission so that the torque is distributed between at least two sets of needle rollers with the axes of each set disposed 90° from each other and 45° from the torque axis.

With the foregoing and other objects, advantages and features of the invention that will become hereinafter apparent, the nature of the invention may be more clearly understood by reference to the following detailed description of the invention, the appended claims and to the several views illustrated in the attached drawings.

DETAILED DESCRIPTION OF THE INVENTION

Figure 1:
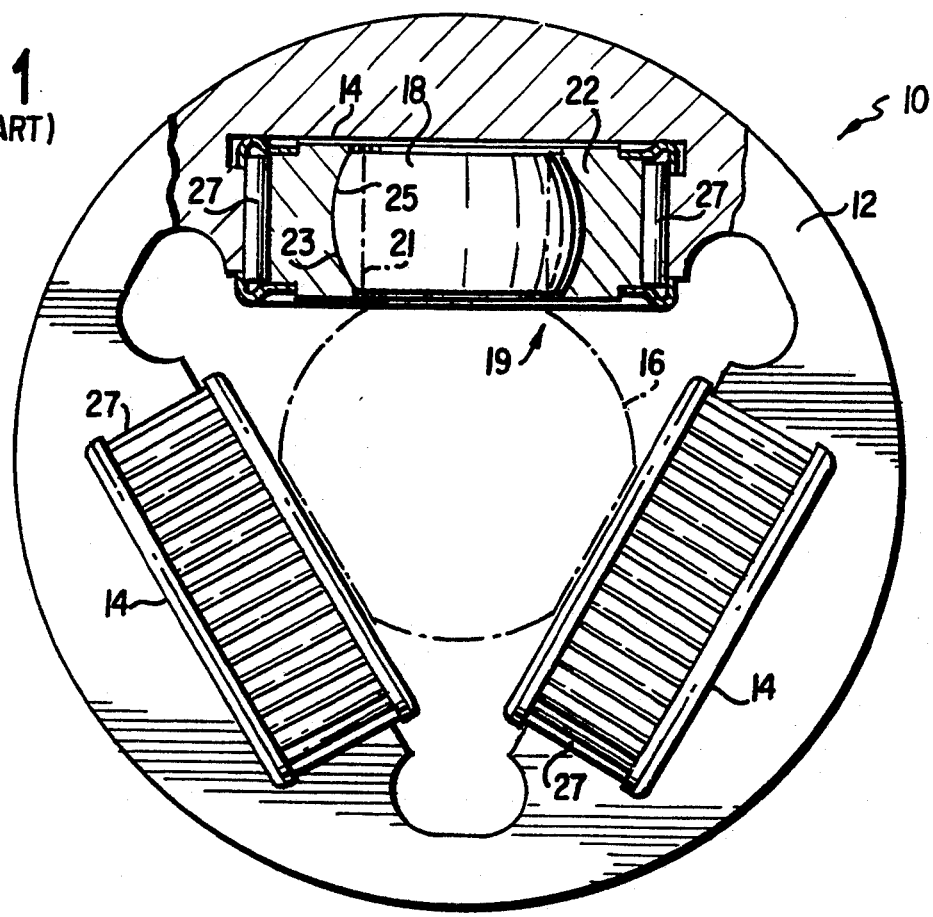
FIG. 1 is an end elevational view of a prior art recirculating needle CVJ with one of the lobes shown in cross-section, illustrating the environment in which the present invention is used.

Referring now to the drawings, there is illustrated in FIG. 1 a prior art constant velocity universal joint which is generally designated by reference numeral 10. The CVJ of FIG. 1 is similar to, for example, the recirculating needle CVJ disclosed in the aforesaid U.S. Pat. No. 4,840,600 to White et al. Constant velocity universal joint 10, as illustrated in FIG. 1, has a housing 12 in which three longitudinally extending channels 14 are formed.

An inner rotatable member 16, which is generally formed in one piece as a drive shaft for the transmission of power in the drive train of the automobile, is provided with three equi-angularly spaced, radially extending trunnions 18 (only one shown). Each of the trunnions 18 extends into one of the channels 14 of housing 12 and is mounted within the respective channel 14 by means of a ball and socket joint 19. The ball and socket joint 19 comprises a ball member 20, intermediate the trunnion and the housing, having an axial bore 21 formed therein and an outer convex surface 23. The ball member 20 is universally mounted within a socket member 22 which has a generally rectangular configuration with an axial bore 25 extending therethrough. The bore 25 has a concave, spherical surface which is complementary to the outer convex surface 23 of ball member 20.

The outer peripheral surface 23 of ball member 20 generally has an asymmetrical, truncated spherical shape which allows universal rotational and tilting movement of the assembly formed by inner rotatable member 16, trunnions 18 and ball members 20 within channels 14 of housing 12. A socket member 22 is provided in each of the three lobes of housing 12 between channels 14 and the respective ball member 20. Socket members 22 have an outer peripheral surface designed to accommodate a plurality of needle rollers 27 as shown and described, for example, in U.S. Pat. No. 4,840,600, the subject matter of which is incorporated herein by reference.

Figure 2:
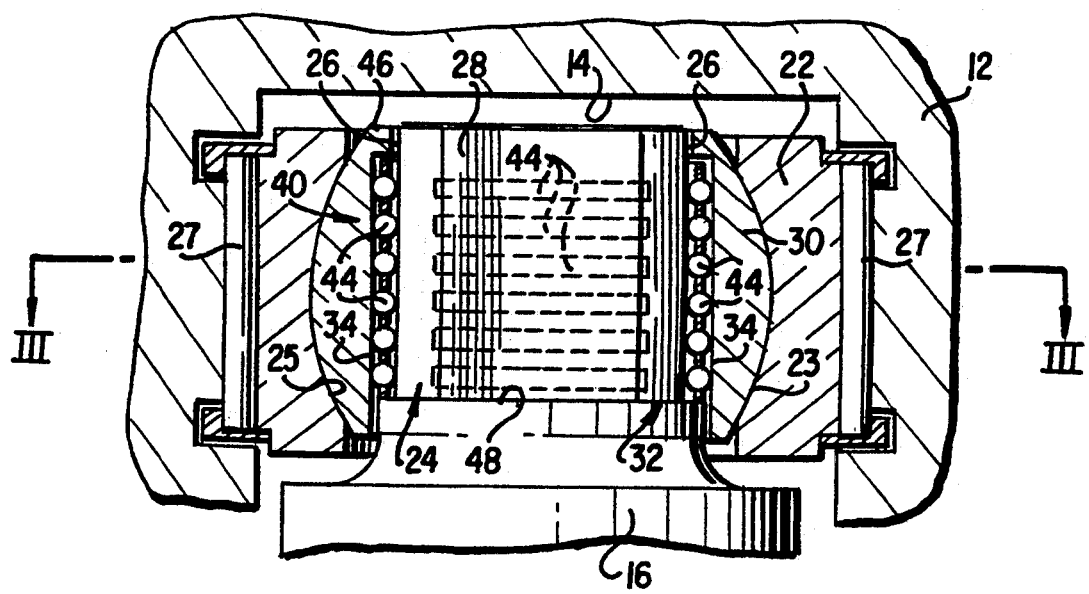
FIG. 2 is a fragmentary, cross-sectional view of one embodiment of the invention, illustrating an antifriction bearing disposed between one of the trunnions and its respective ball member.
Figure 3:
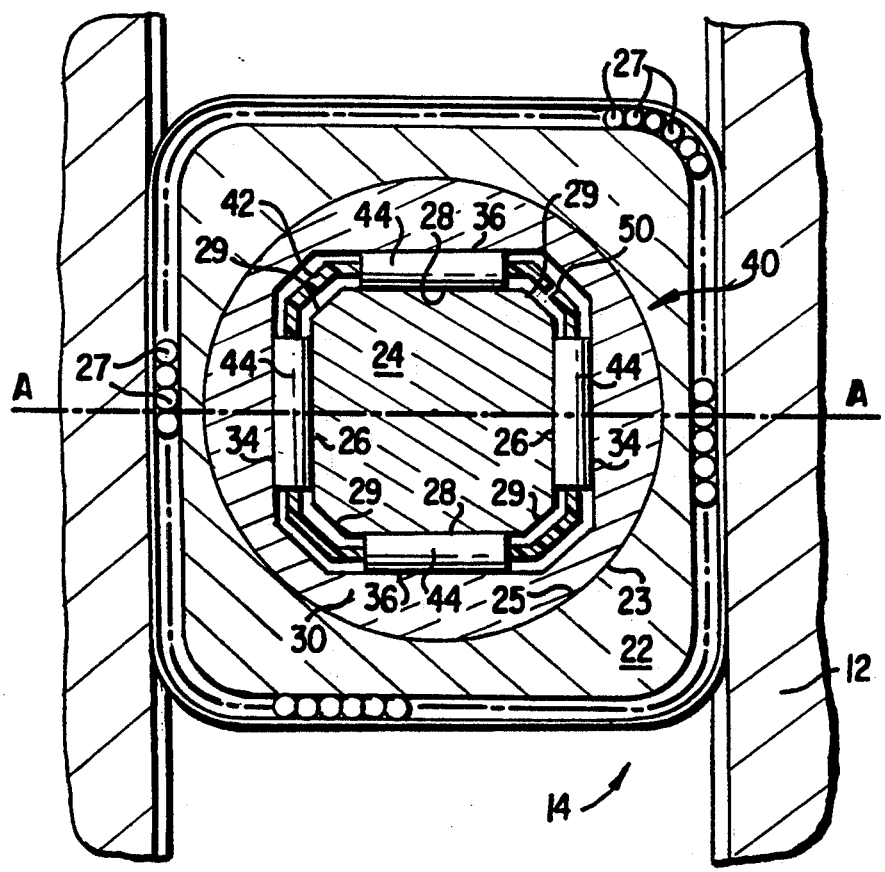
FIG. 3 is a cross-sectional view of the embodiment of the invention shown in FIG. 2 taken along line III—III of FIG. 2.

Referring now to FIGS. 2 and 3, one embodiment of a velocity universal joint made in accordance with the invention will be described in detail. It will be understood that the embodiment of the invention shown in FIGS. 2 and 3 represents one of the three lobes of a recirculating needle CVJ similar to that shown in FIG. 1.

In this embodiment, a housing 12 is formed with three channels 14 (only one shown) into which a respective trunnion 24 extends from inner rotatable member 16. Trunnion 24 has a generally rectangular or square cross-section (FIG. 3) with four planar faces 26, 28. The planar faces 26, 28 may intersect one another at right angles or chamfered surfaces 29 may be provided between faces 26, 28. Trunnion 24 extends into a ball member 30 with a central opening 32 also having four planar faces 34, 36 spaced from a respective planar face 26, 28 of the trunnion 24. Interposed between the pairs of confronting planar faces 26, 34 and 28, 36 is a linear antifriction bearing assembly 40 comprising a generally rectangular or square cage 42 in which a plurality of needle rollers 44 are retained. The longitudinal axes of the needle rollers 44 are arranged normal to the direction of relative axial movement between the trunnion 24 and the ball member 30.

Cage 42 may be made of a plastic material, metal or any other suitable material. Needle rollers 44 may be conventional needle rollers having the shape of elongated right cylinders. It is also possible to use specially manufactured needle rollers having trunnions on the ends, tapered ends or other special configurations.

As best seen in FIG. 2, the ball member 30 is provided with a radially inwardly extending step or flange 46 for limiting the axial travel of the linear bearing assembly 40 radially outwardly from the rotational axis of rotatable member 16. Similarly, a shoulder 48 is provided on trunnion 24 to limit the axial travel of the linear bearing assembly 40 radially inwardly toward the rotational axis of member 16.

The ball member 30 has an outer convex or spherical surface 23 and, like ball member 20 of FIG. 1, is universally mounted within a socket member 22. Socket member 22 has a generally rectangular configuration with an axial bore 25 having a concave, spherical surface complementary to the outer surface 23 of ball member 30. Socket member 22 is mounted in the channel 14 in a substantially frictionless manner by needle rollers 27 in the same manner as in the recirculating needle CVJ of FIG. 1.

According to the invention, trunnion 24 is free to move axially in a relatively frictionless manner within channel 14 relative to ball member 30, thus substantially eliminating sliding friction between trunnion 24 and ball member 30. This prevents a slip-stick motion between the ball member 30 and the trunnion 24 and thereby reduces or eliminates a shudder potential in the automotive vehicle due to sliding friction between those elements.

Additionally, because the trunnion 24 has a generally rectangular cross-sectional configuration as illustrated in FIG. 3, rotation of the ball member 30 relative to the trunnion 24 is prevented. Such rotation is, however, accommodated at the spherical interface surfaces 23, 25 between the ball member 30 and the socket member 22.

To assemble the CVJ of the present invention, one of each of three linear bearing assemblies 40 is inserted over the radially extending ends of each of the three trunnions 24 fixed to rotatable member 16. The ball members 30, together with their pre-assembled socket members 22 and needle rollers 27, are then positioned over a respective trunnion 24 and linear bearing assembly 40 as a unit, with the inner surfaces 34, 36 of ball members 30 rolling against needle rollers 44 of the linear bearing assemblies 40. The entire assembly is then inserted into the three channels 14 of housing 12 so that the rollers 27 bear against the walls of the channels 14 in a frictionless manner. In this assembly, the outer surfaces 26, 28 of trunnions 24 act as an inner race for linear bearing assembly 40, while the inner surfaces 34, 36 of ball members 30 act as an outer race for the linear bearing assembly 40.

It will also be seen from FIG. 3 that cage 42 of linear bearing assembly 40 is provided with a separation or gap 50, which extends along the entire axial length of the cage intermediate adjacent sets of needle rollers 44. Separation or gap 50 is provided for ease in fitting the linear bearing assembly 40 over the trunnions 24, and may be optionally provided or dispensed with, depending on the particular CVJ application to which the linear bearing assembly 40 is applied, as will be appreciated by those skilled in the art.

It is also contemplated within the scope of the invention that the linear antifriction bearing assembly 40 may be modified to provide needle rollers 44 only between the confronting planar surfaces 26 and 34 of the trunnion and ball member respectively. Since the transmission of torque between the rotatable member 16 and the housing 12 occurs through the needle rollers 44 disposed between surfaces 26,34, i.e., in a plane A—A (FIG. 3) transverse to the rotational axis of member 16, it is only necessary to provide substantially frictionless movement between those heavily loaded surfaces. Accordingly, the confronting surfaces 28, 36 of the trunnions 24 and ball member 30 may be in sliding frictional contact since those surfaces transmit only minimal reactive forces generated by the torque acting between the rotatable member 16 and the housing 12 at small angles relative to plane A—A.

Figure 4:
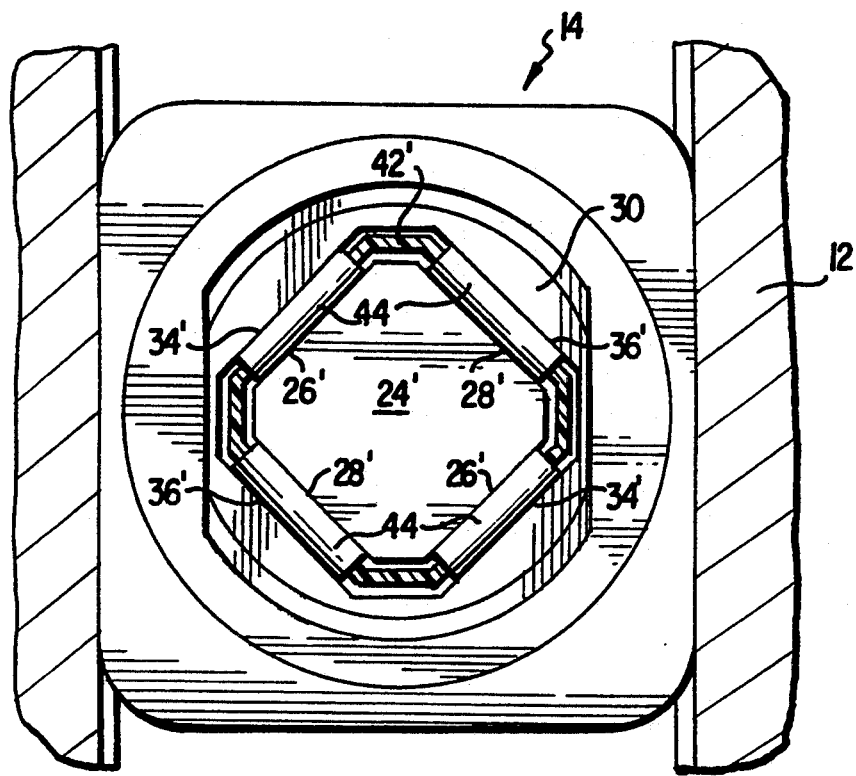
FIG. 4 is a top view of another embodiment of the invention similar to that of FIGS. 2 and 3 with the needle rollers disposed at a 45° angle with respect to the torque transmission axis of the CVJ.

Referring now to FIG. 4, there is illustrated an alternative embodiment of the present invention wherein the trunnion 24' has been oriented with its planar faces 26', 28' arranged at 45° angles with respect to a plane passing through the rotational axis of the CVJ. The planar faces 34', 36' of the ball member 30 are spaced from the respective confronting planar faces 26', 28'. A bearing assembly 40' comprising a cage 42' and needle rollers 44 is interposed between the faces 26', 28' and the faces 34', 36'. In this embodiment, the bearing assembly 40' capable of absorbing greater loads than the bearing assembly 40 of FIGS. 2 and 3 because the torque load is transmitted through two sets of rollers rather than one set as in the embodiment of FIGS. 2 and 3.

Figure 5:
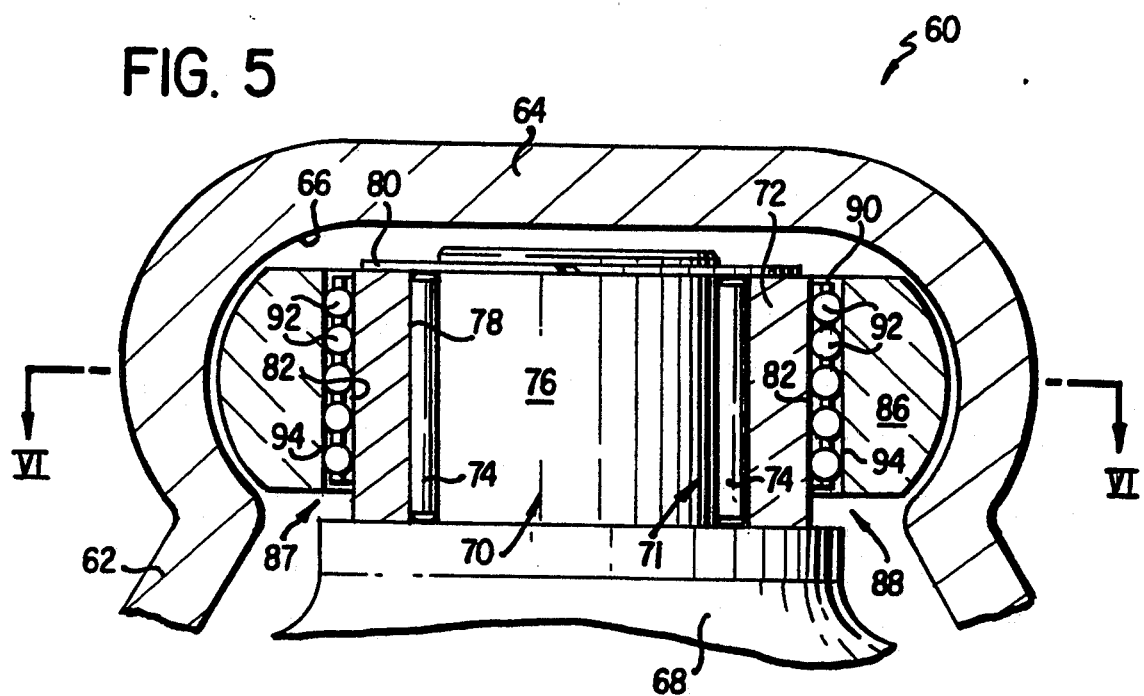
FIG. 5 is a fragmentary cross-sectional view of another embodiment of the invention illustrating another form of frictionless mounting of the ball member to the trunnion of a tripod CVJ.
Figure 6:
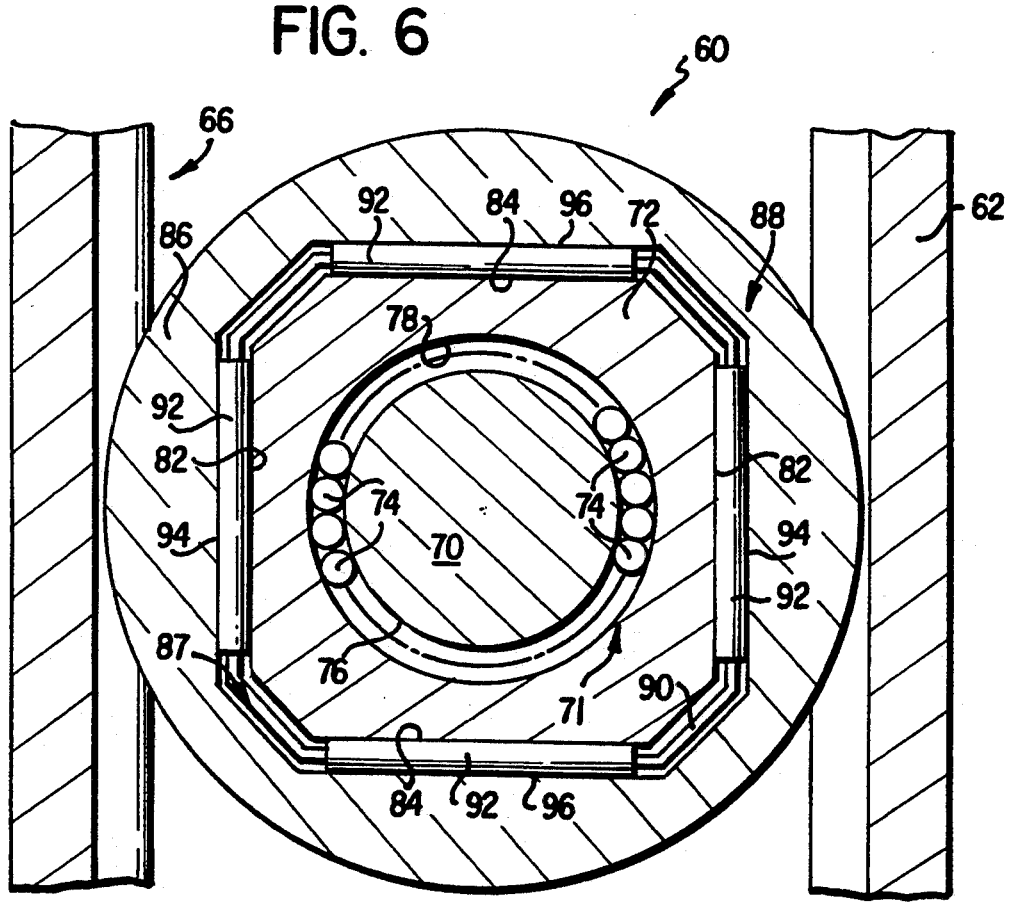
FIG. 6 is a cross-sectional view of the embodiment of the invention shown in FIG. 5 taken along line VI—VI of FIG. 5.

FIGS. 5 and 6 illustrate another embodiment of a constant velocity universal joint 60 of the invention used with a housing 62 having a conventional construction in which the ball members are guided in the channels of the housing. This type of CVJ is known in the art as a tripod CVJ. The CVJ 60 comprises a housing 62 having three lobes 64 each of which includes a channel 66. An inner rotatable member 68 has three trunnions 70 (only one shown) with a cylindrical cross-section (FIG. 6) which extends radially from the axis of rotation of member 68 into channel 66. The structure of one of the joint elements in one lobe will be described.

A first bearing assembly 71 comprises a bearing block member 72 which is mounted for relatively frictionless rotational movement about the axis of trunnion 70 by means of a plurality of needle rollers 74 disposed between the outer cylindrical periphery 76 of trunnion 70 and the inner cylindrical wall of an axial bore 78 in bearing block member 72. Periphery 76 constitutes the inner race of the first bearing assembly 71 and the bore 78 constitutes the outer race thereof. The needle rollers 74 and the bearing block member 72 are retained in position on the trunnion by a retaining means 80, such as a Circlip (FIG. 5).

The outer surface of bearing block member 72 has a generally rectangular or square shape with chamfered corners and comprises oppositely disposed planar faces 82, 84. A ball member 86 having an internal bore 87 is mounted to the first bearing assembly 71 over bearing block member 72 for substantially frictionless axial movement relative to the trunnion 70 by means of a second linear bearing assembly 88 comprising a cage 90 and four sets of needle rollers 92 retained by the cage 90. The needle rollers 92 are disposed between the planar faces 82, 84 of the bearing block member 72 and planar faces 94, 96 formed on the inner bore 87 of the ball member 86. It will be appreciated that the embodiment of FIGS. 5 and 6 provides substantially frictionless movement of the trunnion 70 about its axis relative to the CVJ housing 62 by means of the first bearing assembly 71 and substantially frictionless movement of the trunnion 70 along its axis relative to the housing 62 by means of the second linear bearing assembly 88. Those skilled in the art will appreciate that the locations of the first and second bearing assemblies 71, 88 may be interchanged. That is, the second linear bearing assembly may be positioned about a rectangular trunnion and the first rotational bearing assembly may be positioned in an annular space between the ball member 86 and the bearing block member 72.

It is also possible with the embodiment of FIGS. 5 and 6 to eliminate the two sets of rollers 92 between the planar surfaces 84, 96 in the same manner as described above in connection with the embodiment of FIGS. 2 and 3.

It will also be appreciated by those skilled in the art that, while in the present specification CVJs of the recirculating needle and tripod type have been described and illustrated, the present invention is also useful in any other type of CVJ having two or more lobes.

Although certain presently preferred embodiments of the invention have been described herein, it will be apparent to those skilled in the art to which the invention pertains that variations and modifications of the described embodiments may be made without departing from the true spirit and scope of the invention. Accordingly, it is intended that the invention be limited only to the extent required by the appended claims and the applicable rules of law.

What is claimed is:

1. A constant velocity universal joint comprising:
   a housing having a plurality of channels extending longitudinally therein;
   an inner rotatable member having a plurality of trunnions with radially disposed axes, each of said trunnions extending into a respective one of said channels and being longitudinally movable along such channel, each trunnion having a polygonal outer surface;
   a respective ball and socket joint located between each trunnion and the channel into which such trunnion extends for permitting rotational movement of such trunnion about the axis thereof;
   a first bearing means operatively positioned between each trunnion and a respective ball member of said ball and socket joint for permitting relatively frictionless movement between said trunnion and said respective ball member along the axis of said trunnion, an inner surface of the ball member having a polygonal shape corresponding to the polygonal outer surface of the trunnion and forming an outer race for the first bearing means, the polygonal outer surface of trunnion forming an inner race for the first bearing means; and a second bearing means operatively engaged between a respective socket member of said ball and socket joint and said channel for permitting relatively frictionless movement of such socket member longitudinally along the channel in which such socket member is located.

2. The universal joint of claim 1, wherein said socket member has a generally rectangular outer surface, said second bearing means comprising a plurality of needle rollers arranged to circulate about the outer surface of said socket member.

3. The universal joint of claim 1, including a flange extending inwardly from the inner surface of the ball member for limiting the axial travel of the first bearing means radially outwardly toward the axis of rotation of the inner rotatable member and a shoulder provided on the trunnion for limiting the axial travel of the first bearing means radially inwardly toward the axis of rotation of the inner rotatable member.

4. The universal joint of claim 1, wherein said first bearing means comprises a linear bearing assembly including a cage having sides formed in a polygonal shape in cross-section corresponding to the polygonal outer surface of the trunnion and a plurality of rollers retained on at least two of the sides of said cage with the central longitudinal axes of the rollers being disposed normally to the direction of axial movement between the trunnion and its respective ball member.

5. The universal joint of claim 4, including a gap disposed in one side of said cage to facilitate fitting said cage to said trunnion.

6. A constant velocity universal joint comprising:
a housing having a plurality of channels extending longitudinally therein;
an inner rotatable member having a plurality of trunnions with radially disposed axes, each of said trunnions extending into a respective one of said channels and being longitudinally movable along such channel, each trunnion having a polygonal outer surface, the polygonal outer surface of each trunnion being rectangular;
a respective ball and socket joint located between each trunnion and the channel into which such trunnion extends for permitting rotational movement of such trunnion about the axis thereof;
a first bearing means operatively positioned between each trunnion and a respective ball member of said ball and socket joint for permitting relatively frictionless movement between said trunnion and said respective ball member along the axis of said trunnion;
a second bearing means operatively engaged between a respective socket member of said ball and socket joint and said channel for permitting relatively frictionless movement of such socket member longitudinally along the channel in which such socket member is located; and
the first and second bearing means comprising needle rollers.

7. The universal joint of claim 6, wherein the rectangular shaped outer surface of each trunnion has sides on which the rollers of the first bearing means roll, said sides being disposed at 45° angles to the direction of longitudinal movement of said trunnion in said channel.

8. A constant velocity universal joint comprising:
a housing having a plurality of channels extending longitudinally therein;
an inner rotatable member having a plurality of trunnions with radially disposed axes, each of said trunnions extending into a respective one of said channels and being longitudinally movable along such channel, each trunnion having a circular outer surface;
a bearing block member disposed between each trunnion and its respective channel, said bearing block member having an inner circular bore and an outer polygonal surface;
first bearing means interposed between the circular outer surface of each trunnion and the inner circular bore of the bearing block associated therewith for permitting relatively frictionless rotational movement of said trunnion about its axis;
a ball member positioned between each channel and each bearing block, each ball member having a polygonal inner surface corresponding to the polygonal outer surface of the bearing block; and
second bearing means disposed between the inner surface of each ball member and the outer surface of the bearing block associated therewith for permitting relatively frictionless movement between the respective trunnion and such ball member along the axis of such trunnion.

9. The universal joint of claim 8, wherein the polygonal surfaces of said bearing block member and ball member are rectangular, said second bearing means comprising a linear bearing assembly including a cage having sides formed in a rectangular shape in cross-section corresponding to the rectangular outer surface of the bearing block and a plurality of rollers retained on the sides of said cage with the central longitudinal axes of the rollers being disposed normally to the direction of axial movement between the trunnion and its respective ball member.

10. The universal joint of claim 8, wherein said first and second bearing means each comprise a plurality of needle rollers.

* * * * *